United States Patent

[11] 3,627,914

[72] Inventor Kenneth P. Davies
Pointe Claire, Quebec, Canada
[21] Appl. No. 855,296
[22] Filed Sept. 4, 1969
[45] Patented Dec. 14, 1971
[73] Assignee Central Dynamics, Ltd.
Pointe Claire, Montreal, Quebec, Canada

[54] AUTOMATIC TELEVISION PROGRAM CONTROL SYSTEM
12 Claims, 2 Drawing Figs.

[52] U.S. Cl. 178/5.8, 178/5.6, 178/DIG. 6
[51] Int. Cl. H04n 7/00
[50] Field of Search 178/DIG. 6, 5.8

[56] References Cited

UNITED STATES PATENTS

| | | | |
|---|---|---|---|
| 2,964,589 | 12/1960 | Walker | 178/5.4 |
| 2,969,427 | 1/1961 | See | 178/5.8 |
| 3,120,652 | 2/1964 | Weighton et al. | 178/5.8 |
| 3,190,969 | 6/1965 | Mattis | 179/100.2 MI |

*Primary Examiner*—Robert L. Griffin
*Assistant Examiner*—Donald E. Stout
*Attorney*—Addams & Ferguson

ABSTRACT: In an automatic television programming control system, circuitry for (1) effecting the insertion of a matte or the like in a background picture, (2) providing for a transition (such as a dissolve or fade) from one audio source to another, and (3) effecting background audio such as music for a foreground audio signal.

INVENTOR
KENNETH P. DAVIES
BY Addams & Ferguson
ATTORNEYS

| TRUE TIME OF START | DURATION | VIDEO SOURCE A | B | C M | HUE | VIDEO TRANSITION | AUDIO FULL | AUDIO UNDER | AUDIO TRANSITION | TITLE & REMARKS |
|---|---|---|---|---|---|---|---|---|---|---|
| 092133 | 0025 | V1 | | M | | | V1 | | | V1696 |
| 092858 | 0010 | A1 | S2 | | 8 | D1 | C2 | | D | F31538 |
| 092903 | 0005 | A1 | | M | | I | C1 | C2 | D | S387 |
| 092918 | 0015 | A2 | | | | W7 | F3 | | I | TIDE |
| 092933 | 0025 | S1 | | | | R6 | C1 | | D | KTTV |

Fig. 2

INVENTOR
KENNETH P. DAVIES

BY Addams & Ferguson
ATTORNEYS

AUTOMATIC TELEVISION PROGRAM CONTROL SYSTEM

BACKGROUND OF THE INVENTION

This invention relates to automatic program controllers and in particular to such controllers having the capability of providing for (1) the insertion of a second video source into a main video source, and (2) the background audio, and (3) various kinds of transitions from one audio source to another.

Prior art automatic program control systems are known and as such are described, for example, in U.S. Pat. No. 2,969,427 granted to H. P. See on Jan. 24, 1961. Important advances have been made in the arrangement and operation of such systems. However, heretofore, the manual execution of television programs has usually permitted more flexibility in the execution of the programming sequence.

Typically, in an automatic programming system a plurality of events to be performed at a television broadcast station are stored in a computer memory or the like where they are executed at an appropriate time under the control of a real time clock. Each event corresponds to one or more devices to be operated and the particular operations to be performed thereon. The devices usually include video tape recorders, film projectors, etc. Heretofore the operations to be performed thereon usually include switching, starting up and turning off the devices. However, the need for further capabilities has arisen in order to make the automatic program systems more flexible.

An automatic system is not prone to execution errors such as is the case with a system which is manually operated. Hence, the automatic system is particularly valuable in those situations where a tendency toward error by the human operator is high. In particular, in situations where either a short or long amount of time exists between events, it is desirable and economical to have an automatic program control system.

SUMMARY OF THE INVENTION

Hence, it is a primary purpose of this invention to provide an automatic programming system having increased flexibility and capabilities.

It is a further object of this invention to provide in an automatic television programming system, the capability of providing the insertion of a second video source into a main video source.

It is a further object of this invention to provide in an automatic television programming system, the capability of providing background audio such as music.

It is a further object of this invention to provide in an automatic television programming system, the capability of performing various transitions from one video or audio source to another video or audio source respectively, the transitions including, for example, lap dissolves, fades, and takes.

Other objects and advantages of this invention will become apparent upon reading the appended claims in conjunction with the following detailed description and the attached drawing.

DETAILED DESCRIPTION OF A PREFERRED EMBODIMENT OF THE INVENTION

Figure 1:
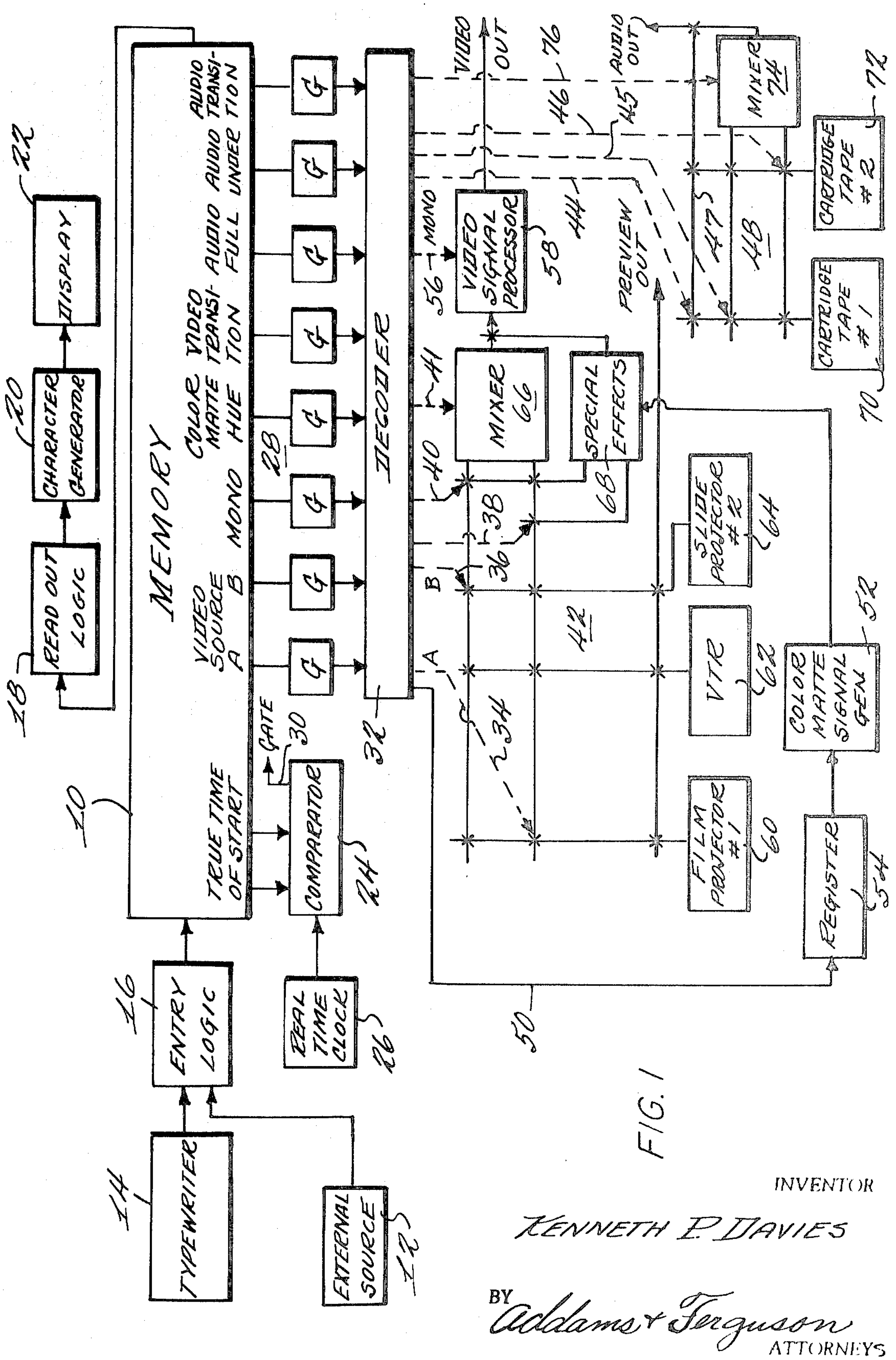

Referring to FIG. 1 there is shown a block diagram of an illustrative embodiment of the invention. The program is loaded into a memory 10 which typically contains twenty words, where each word may include 40, six-bit characters. In each word is stored information relating to an event of the television program. Hence, each word will hereinafter be referred to as an event.

In order to have a better understanding of typical events, reference should be made to FIG. 2 which illustrates the face of a typical display tube having displayed thereon events which would typically occur during an illustrative television programming sequence. As mentioned hereinbefore, the capacity of the memory 10 may be twenty events or words. The display raster is so chosen that typically 16 of the events can be simultaneously displayed thereby enabling editing of future events prior to their being executed on air. However, this aspect of the disclosure does not form the part of the invention.

Referring to the column headings shown on the display it can be seen that the first column relates to the true time of start of an event, the time being given in hours, minutes, and seconds; hence, the "on-air" event shown in the first row started at the 9th hour, the 21st minute, and the 33rd second of the programming day.

The second column indicates the duration of the event in minutes and seconds. Hence, the duration of the "on-air" event is 25 seconds.

The third column headed by the letter "A" identifies the main video source and the letter corresponds to a source type identification—that is, various types of video sources are assigned different letters, for example, video tape recorders are assigned the letter "V," while slide projectors are assigned the letter "S," and film projectors, the letter "A." The number following the letter code identifies individual source selections—that is, each slide projector is assigned a different number; and thus, the particular one required for a certain event may be appropriately identified.

The fourth column, headed by the letter "B" identifies a second video source which is to be inserted in the main video source. The insert video source type and the video source number are displayed in a format identical to that used for the main video source in the third column.

In the fifth column (headed by the letters "C" and "M") is provided monochrome identification information. Thus, if a monochrome segment is to be included in the program, the appearance of the letter "M" in this column will automatically select the monochrome camera on a two-camera multiplexer, provide contacts to switch the monochrome output of a decoder and set a video signal processor to the correct mode. The absence of a letter in this column indicates that the segment is in color.

In the sixth column is provided hue information which is used to regulate the hue of a color matte, specified in the fourth column. Each hue is assigned an appropriate number. Thus, if the color matte were yellow (75 percent), this would correspond to the code number six, for example, while a white (75 percent) color matte corresponds to the number eight. Further, a "K" in the sixth column would indicate that the source specified in the fourth column corresponds to a picture to be inserted rather than a title or the like.

In the column labeled "video transition" there is provided information identifying the type of transition from one event to the next. This information consists of a two-part symbol, the first part of which is a transition type (corresponding to the alphabetic letter) and the second part of which is a numeric corresponding either to a dissolve speed, a wipe format, or a fade mode. Typically, the letter "D" corresponds to a lap dissolve, the letter "T" corresponds to a take (cut), the letter "W" corresponds to a normal wipe, and the letter "R" corresponds to a reverse wipe. Referring to the fourth and fifth rows of the typical display of FIG. 2, the numeric seven following the letter "W" in the fourth row corresponds to a diagonal wipe (upper right) while the numeric six corresponds to a diagonal wipe (upper left). Further, the numeric one following the letter "D" in row 2 corresponds to a transition speed of one-half second for the lap dissolve.

In the column labeled "audio full" is provided a two-part symbol, which identifies the full audio source as opposed to a background audio source. Once again the source definition consists of a source type identification followed by a source number identification. Typically, the letter "V" identifies a video tape recorder, the letter "C" identifies a cartridge tape (cycle mode), and the letter "F" identifies a film projector.

In the column labeled "audio under" is provided information identifying an audio source which may act as background music, for example, for the full audio source. Once again, an audio source type and source number are displayed in a format identical to those used in the "audio full" column.

In the column labeled "audio transition" are provided audio transition codes where typically "D" corresponds to a lap dissolve having a preset rate of one second, "F" corresponds to a fade of 1 second, and "T" corresponds to a take (200 millisecond dissolve, for example). It would, be obvious to one of ordinary skill in the art that a further capability could be added whereby the audio transition rates could also be coded; however, this is not contemplated in the present embodiment of the invention.

In the column entitled "title and remarks" is provided miscellaneous identification information which may be used by the operator to identify the various events comprising the television programming sequence. This information is not decoded for operational purposes and the full character format may be used. Typically, 10 characters are reserved for this purpose.

Having described the display of FIG. 2 in general, the second event shown in the display will be now described. This event begins at the ninth hour, 28 minute, and 58 second of the programming day, its duration being 10 seconds. The main video source is film projector No. 1. The picture from this film projector will have inserted therein the matte from slide projector No. 2. The color of the matte will be white (75 percent) as determined by the numeric eight in the "hue" column. The audio signal will be derived from the second carriage tape. At the end of this event, there will be a lap dissolve to film projector No. 1 without the matte (as specified by the next event), the dissolve taking one-half second as determined by the numeric one following the letter "D" in the "video tansistion" column. Further, at the end of the second event there will be a lop dissolve of the audio taking one second whereby the audio of the second carriage tape will become the background of the first carriage tape.

Reference should now be made to FIG. 1 for a further description of the arrangement and operation thereof. Each event is typically loaded into the memory from an external source 12, which typically comprises a card reader or tape reader where each card would, for example, contain information corresponding to a single event. Further, the information can be loaded from typewriter 14 if so desired. However, typically, the typewriter is used for information correction rather than loading of an entire television program. The information from source 12 or typewriter 14 is fed through appropriate entry logic 16 into memory 10 which may be of the pushdown type. Indicated on the memory block 10 are the headings of the columns which are decoded in order to execute the programming sequence. However, it is to be understood that the memory stores all of the information corresponding to the headings of FIG. 2. However, for ease of explanation, only those headings which enter into the operational portion of the program execution are indicated on memory block 10 of FIG. 1.

The contents of memory 10 are repeatedly scanned by readout logic 18 and applied to character generator 20 and thence to display 22 which corresponds to that shown in FIG. 2. The operation of the logic 18, generator 20 and display 22 are well-known to those of ordinary skill in this art.

In order to execute the program, the information from the "true time of start" column is applied to a comparator 24 where the contents of a real time clock 26 are compared with the "true time of start" data to determine when the events of the television program are to be executed. When an equal comparison is detected by the comparator 24, an output signal therefrom conditions the gates generally indicated at 28 via a first control signal over an appropriate output line 30 to apply the information in the second row or word of the memory 1 to the gates 28 and thence to decoder 32 where each video and audio source is identified together with the instructions to be performed with respect to these sources. The construction of such a decoder would be obvious to those of ordinary skill in this art. For example, reference should be made to the text "-Pulse and Digital Circuits" by Millman and Taub, McGraw-Hill Book Company, Inc., 1956, pages 422–424 for a description of decoders suitable for use with this invention. The output of decoder 32 is employed to regulate many different circuits and apparatus which typically make up the operational components of the signal generating and processing portion of a television broadcast station.

Hence, control signals are applied over lines 34, 36, 38 and 40 to a video switching matrix generally indicated at 42. Of course control lines would be connected to each cross-point of the matrix. However, for ease of explanation, only those which enter into the operational description are shown. Similar simplifications are also made hereinafter to further facilitate the description of the invention. Control signals are also applied over lines 44, 45 and 46 to an audio switching matrix generally indicated at 48. Also, a data signal is applied over line 50 (which may be a plurality of lines) to register 54 which controls color matte signal generator 52. A description of a typical color matte generator 52 may be found in U.S. Pat. No. 2,524,157 granted Oct. 13, 1970 to Ole Skrydstrup and based on U.S. Pat. application Serial No. 716,212 filed Aug. 26, 1968, the application having been referred to in U.S. application Ser. No. 828,536 mentioned hereinafter and incorporated herein by reference. This data signal corresponds to the contents of the "hue" column. Also, a control signal is applied over line 56 to provide video signal processor 58 with information relating to whether a monochrome segment has been included in the television programming sequence.

Returning to the video switching matrix 42, there are shown various sources connected thereto, which are typified by film projector 60 (A1), video tape recorder 62, typified by film projector 60 and slide projector 64 (No. 2). Depending upon the information specified by the event, video information may be connected to mixer 66 or special effects circuit 68 and if neither of these processing modes are required, the video signal can be connected directly to the onair bus, such direct connection not being shown in FIG. 1. Circuitry for implementing the functions of mixer 66 and special effects circuit 68 is disclosed in U.S. Pat. application Ser. No. 828,536 mentioned hereinafter and incorporated herein by reference.

Referring to the audio switching matrix 48, typical audio sources are shown in FIG. 1. When the real time clock indicates that the preview event (that is, the event immediately following the onair event) is to be executed, this event is moved to the topmost or bottommost word of memory 10 and decoded at decoder 32 to effectuate the execution of the event. Events may be programmed to occur at a specific clock (or "true") time or on a "duration" time basis.

The decoder 32 thus detects that the main video source is identified as A1 (which for purposes of illustration corresponds to film projector 60) and thus applies a control signal over line 34 to close the cross-point switch which connects the main video bus to film projector A1. Further, detection of S2 in the insert video source column results in a control signal on line 36 which closes the switch which connects the insert video bus and slide projector No. 2. Also, control lines 38 and 40 are energized to thereby switch film projector No. 1 and slide projector No. 2 to special effects circuit 68 where the matte from the slide projector is inserted in the picture from the film projector. This is one of the novel aspects of this invention. This feature has not been provided hereinbefore in automatic program control systems and its incorporation into the instant system increases the flexibility and value of such systems significantly.

Also, an appropriately coded representation of the number eight is applied over line 50 (which may be several lines) to register 54 indicating that the hue of the matte from slide projector No. 2 is to be white (75 percent). The output of register 54 'selects the color generated by color matte signal generator 52 in a manner known to those of ordinary skill in this art.

Further, the detector 32 will cause a control signal to be applied over line 44 in response to the detection of the code C2 in the "audio full" column thereby connecting the audio out bus 47 and the cartridge tape 70 (No. 1).

Proceeding to the preview event (or third event shown in FIG. 2 for purposes of this example), the real time clock 26 will continually update itself until its contents correspond to the true time of start of the next event—namely, 9 hour, 29 minute, 3 second. At this time the comparator will produce an output signal over line 30 once again conditioning the gates 28 to apply new instruction and data signals to decoder 32. The operation of the real time clock together with the comparator in the manner described above is well-known in automatic programming systems and as such forms no part of the present invention.

The occurrence of the output signal on line 30 also causes the "video transistion" and "audio transition" instructions specified in the "onair" event (or the second event shown in FIG. 2 for purposes of this example) to be executed whereby the video signal is lap dissolved from projector No. 1 with the matte from slide projector No. 2 to projector No. 1 without the matte. The dissolve takes one-half second as determined by the numeric one following the letter "D" in the video transition column. The dissolve is controlled by the control signal applied over line 41 to mixer 66. The manner for effecting such dissolves under the control of an electrical signal is well known and such does not formed a part of this invention.

In order to effect the above dissolve the output of the special effects circuit 68 must also be connected to the input of mixer 66, this connection not being shown in FIG. 1. Further, circuit changes must also be made to effect the above dissolve but in order to simplify the explanation, this circuitry is not shown. Reference may be made to FIGS. 2 and 3 of copending U.S. application Ser. No. 828,536 filed May 28, 1969 by Ole Skrydstrup (which application is incorporated herein by reference) for a detailed description of circuitry capable of mixing a video signal with an insert to the video signal only. Following the dissolve, only the film projector No. 1 will be "onair" which is as specified in the third event of FIG. 2.

The control signal on line 30 also causes the audio lap dissolve specified in the "audio transition" column of the second event of FIG. 2. Thus, control signals are applied to line 45 and 46 to connect tape No. 1 and tape No. 2 to mixer. Further, a control signal is applied to mixer 74 whereby a lap dissolve is made from tape No. 1 along to tape No 2 with tape No. 1 as background, as specified in the third event of FIG. 2. The manner of effecting the dissolve is essentially the same as that for effecting the video dissolve and as such is well-known to those of ordinary skill in this art.

The signal from film projector is to be treated as a monochrome signal during this segment of the program as indicated by the "M" in the third event of FIG. 2. Thus, an appropriate control signal is applied over line 56 to indicate control signal is applied over line 56 to indicate to the video signal processor 58 that the signal is to be treated as monochrome. For a more detailed explanation of processor 58, reference should be made to copending U.S. application Ser. No. 673,678 filed by John D. Ross on Oct. 9, 1967. The remaining features of the third event are essentially similar to those of the previous event and thus explanation of them is not deemed necessary.

The provision of the "audio under" capability in an automatic programming system has not heretofore been employed in automatic programming systems. Further, the provision of the "audio transition" capability has also not been so employed. These capabilities further enhance such systems and the incorporation thereof in these systems, once again, renders the systems significantly improved.

Numerous modifications of the invention will become apparent to one of ordinary skilled in the art upon reading the foregoing disclosure. During such a reading it will be evident that this invention provides a unique automatic television program controller for accomplishing the objects and advantages herein stated.

What is claimed is:

1. In an automatic programming control system including a memory for storing a plurality of events corresponding to the television program sequence where each event specifies different equipments to be operated upon and the particular operations to be performed thereon; means for entering the events into the memory; means for displaying the events at an appropriate display; means for executing the television program sequence under the control of a real time clock; and means for gating the contents from said memory under the control of said real time clock whenever an event is executed, the improvement comprising:

means for storing information in each said event in said memory relating to the identification of (1) a first signal source, and (2) a second signal source;

means for decoding said information relating to said first and second signal sources to provide output signals uniquely identifying said sources;

means responsive to the signals from said sources for effecting a predetermined interaction therebetween;

switching means responsive to said decoding means output signals for connecting said sources to said interaction effecting means; and display means responsive to said means for storing for displaying at least two of said events, the format of the display comprising a matrix, a first column of which displays the respective starting times of said events, a second column of which displays the respective said identifications of said first signal source and a third column of which displays the respective said identifications of said second signal source.

2. The improvement as in claim 1 where said first signal is a video background signal and said second signal is a video insert signal and where said interaction effecting means includes special effects means for inserting the insert signal into the background signal.

3. The improvement as in claim 2 where said insert signal is a matte and where said information stored in said memory includes information relating to the hue of said matte, where said decoding means includes means for decoding said last-mentioned information to provide a data signal indicative of said hue, and where said improvement includes means responsive to said data signal for regulating the hue of the matte inserted into said background signal.

4. The improvement as in claim 1 where said first signal is an audio foreground signal and said second signal is an audio background signal and where said interaction effecting means includes mixing amplifier means for mixing said foreground and background signals.

5. In an automatic programming control system including a memory for storing a plurality of events corresponding to the television programming sequence where each event specifies different equipments to be operated upon and the particular operations to be performed thereon; means for entering the events into the memory; means for displaying the events at an appropriate display; means for executing the television programming sequence under the control of a real time clock, and means for gating the contents from said memory under the control of said real time clock whenever an event is executed, the improvement comprising:

means for storing information in said memory relating to (1) the identification of at least one first audio source, (2) the identification of at least one second audio source, and (3) for storing information relating to a predetermined transition from said first audio source to said second audio source;

means for decoding said information relating to said first audio source, said second audio source, and said transition between said sources, said decoding means in response to said information providing output signals uniquely identifying said sources and said transition therebetween:

means for operating on the signals from said sources to effect the transition therebetween;

switching means responsive to said decoding means output signals for connecting said sources to said transition effecting means; and display means responsive to said means for storing for displaying at least two of said events, the format of the display comprising a matrix, a first column of which displays the respective starting times of said events, a second column of which displays the respective said identifications of said first signal source and a third column of which displays the respective said identifications of said second signal source.

6. The improvement as in claim 5 where said transition effecting means includes means for lap dissolving from said first audio source to said second audio source.

7. The improvement as in claim 5 where said transition effecting means includes means for fading from said first audio source to said second audio source.

8. An automatic programming control system comprising a memory for storing a plurality of events corresponding to the television program sequence where each event specifies different equipments to be operated upon and the particular operations to be performed thereon; means for entering the events into the memory;

means for executing the television program sequence under the control of a real time clock;

means for gating the contents from said memory under the control of said real time clock whenever an event is executed;

means for storing information in each said event in said memory relating to the identification of (1) a first signal source, and (2) a second signal source;

means for decoding said information relating to said first and second signal sources to provide output signals uniquely identifying said sources;

means responsive to the signals from said sources for effecting a predetermined interaction therebetween;

means responsive to said decoding means output signals for connecting said sources to said interaction effecting means; and display means responsive to said storing means for displaying at least two of said events, the format of the display comprising a matrix, each row of which displays one of said events, a first column of which displays the respective starting times of said events, a second column of which displays the respective said identifications of said first signal source and a third column of which displays the respective said identifications of said second signal source.

9. A display format for use with automatic programming control systems including a memory for storing a plurality of events corresponding to the television program sequence where each event specifies different equipments to be operated upon and the particular operations to be performed thereon; means for entering the events into the memory; means for executing the television program sequence under the control of a real time clock; means for gating the contents from said memory under the control of said real time clock whenever an event is executed; means for storing information in each said event in said memory relating to the identification of (1) a first signal source; and (2) a second signal source; means for decoding said information relating to said first and second signal sources to provide output signals uniquely identifying said sources; output means; and means responsive to said decoding means output signals for connecting said sources to said output means; display means responsive to said storing means for displaying at least two of said events, the format of the display comprising a matrix, each row of which displays one of said events, a first column of which displays the respective starting times of said events, a second column of which displays the respective said identifications of said first signal source and a third column of which displays the respective said identifications of said second signal source.

10. The improvement as in claim 9 where said first signal is a video background signal and said second signal is a video insert signal and where said interaction effecting means includes special effects means for inserting the insert signal into the background signal.

11. A display format for use with automatic control systems of television programs, said format being as shown in FIG. 2.

12. The improvement as in claim 1 where said switch-means comprises a matrix of switching elements, at least a first pair of said switching elements being connected to said first and second signal sources respectively and said interaction effecting means.

* * * * *